(12) United States Patent
Atkin et al.

(10) Patent No.: US 8,092,118 B2
(45) Date of Patent: Jan. 10, 2012

(54) CARBON SEQUESTRATION METHOD

(75) Inventors: Bill Atkin, Boulder City, NV (US);
Terry Gong, Moraga, CA (US); John Harmon, Bakersfield, CA (US); Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 306 days.

(21) Appl. No.: 12/462,260

(22) Filed: Jul. 31, 2009

(65) Prior Publication Data
US 2011/0027017 A1 Feb. 3, 2011

(51) Int. Cl.
*A01C 21/00* (2006.01)
(52) U.S. Cl. .................... 405/129.1; 47/58.1 SC
(58) Field of Classification Search ........... 405/129.1; 47/58.1 SC
See application file for complete search history.

(56) References Cited

U.S. PATENT DOCUMENTS

| | | | | |
|---|---|---|---|---|
| 3,337,989 | A * | 8/1967 | Harmon | 47/58.1 R |
| 5,221,312 | A * | 6/1993 | Buhidar | 71/12 |
| 5,822,919 | A * | 10/1998 | Griffeth | 47/48.5 |
| 6,681,521 | B1 * | 1/2004 | Holloway | 47/56 |

OTHER PUBLICATIONS

Building Carbon Credits with Biosolids Recycling, Brown, et al., Biocycle, Sep. 2004.*
Carbon Cycle and Carbon Dioxide interchange between carbon sinks; http://www.uwsp.edu.geO/faculty/ritter/geog 1 . . . .
Physical Geography.net, Chapter 9: Introduction to the Biosphere (r) The Carbon Cycle.
"Soil and Carbon Credits" by Dr. Christine Jones, Mar. 5, 2006 YLAD Living Soils Seminars: Eurongilly—Feb. 14, Young—Feb. 15, 2006.

* cited by examiner

*Primary Examiner* — John Kreck
(74) *Attorney, Agent, or Firm* — Marcus G. Theodore (57) ABSTRACT

A method to create a net increase in soil organic carbon (SOC) by acidifying land applied waters with pH adjusted sulfur dioxide to open up soil pores at greater depths, while providing sulfur and other nutrients to plants and soil bacteria to stimulate and increase their overall grow and their assimilation of carbon dioxide to sequester a greater net volume increase of soil organic carbon (SOC).

16 Claims, 6 Drawing Sheets

SIMULATED TITRATION pH VALUES/Volume Added

| Vadd (mL) | "pH" simulated |
|---|---|
| 0.000 | 1.806 |
| 2.157 | 2.020 |
| 4.096 | 2.235 |
| 5.754 | 2.449 |
| 7.077 | 2.664 |
| 8.061 | 2.878 |
| 8.749 | 3.093 |
| 9.210 | 3.307 |
| 9.508 | 3.522 |
| 9.697 | 3.736 |
| 9.817 | 3.951 |
| 9.894 | 4.165 |
| 9.944 | 4.380 |
| 9.982 | 4.594 |
| 10.014 | 4.809 |
| 10.050 | 5.023 |
| 10.098 | 5.238 |
| 10.170 | 5.452 |
| 10.282 | 5.667 |
| 10.457 | 5.881 |
| 10.730 | 6.096 |
| 11.144 | 6.310 |
| 11.748 | 6.525 |
| 12.577 | 6.739 |
| 13.626 | 6.954 |
| 14.824 | 7.168 |
| 16.044 | 7.383 |
| 17.146 | 7.598 |
| 18.041 | 7.812 |
| 18.706 | 8.027 |
| 19.169 | 8.241 |
| 19.478 | 8.456 |
| 19.677 | 8.670 |
| 19.804 | 8.885 |
| 19.886 | 9.099 |
| 19.941 | 9.314 |
| 19.982 | 9.528 |
| 20.018 | 9.743 |
| 20.059 | 9.957 |
| 20.115 | 10.172 |
| 20.200 | 10.386 |
| 20.333 | 10.601 |
| 20.548 | 10.815 |
| 20.896 | 11.030 |
| 21.459 | 11.244 |
| 22.365 | 11.459 |
| 23.818 | 11.673 |
| 26.155 | 11.888 |
| 29.983 | 12.102 |
| 36.644 | 12.317 |
| 50.000 | 12.531 |

CARBON SEQUESTRATION METHOD

BACKGROUND OF THE INVENTION

1. Field

This invention pertains to carbon sequestration. In particular, it pertains to a method to create a net increase in soil organic carbon (SOC) by acidifying land applied waters with pH adjusted sulfur dioxide to open up soil pores while providing nutrients to plants and soil bacteria, which assimilate carbon dioxide.

2. State of the Art

Carbon (C) sequestration refers to the storage of carbon into a stable form. This act of sequestering carbon is dependent upon the nature of the carbon sink and can be achieved by several ways: directly by inorganic chemical reactions that cause carbon dioxide ($CO_2$) in the form of carbonates/bicarbonates to bond with dissolved minerals and salts to form compounds such as calcium and magnesium carbonates; by plant photosynthesis, which uses sunlight to combine carbon dioxide ($CO_2$) from the air and water ($H_2O$) to form glucose ($C_6H_{12}O_6$), a simple sugar that is stored within the tissue of living plants; and indirectly, by the microbial decomposition of the biomass of plant and animal tissue into other compounds such as carbohydrates, proteins, organic acids, humic substances, waxes, coal, oil, and natural gas, etc. Combined together, these organic compounds essentially act to "hold soil together", and is how soil attains its fertility. The higher the content of SOC, the greater the fertility and productivity of the soil. Soil microbes comprise bacteria, algae, viruses, actinomycetes, and protozoia. Fungi are generally multi-celled organisms, but will hereinafter be included in the term soil micro-organisms, or microbes, for short.

Microbes are classified as autotrophs, which derive their energy from the sun through photosynthesis or chemical reactions. Autotrophs fix carbon dioxide to make their own food source, which may be fueled by light energy (photoautotrophic), or by oxidation of nitrogen, sulfur, or other elements (chemoautotrophic). While chemoautotrophs are uncommon, photoautotrophs are common and quite diverse. Chemoautotrophs include the cyanobacteria, green sulfur bacteria, purple sulfur bacteria, and purple nonsulfur bacteria. The sulfur bacteria are particularly interesting, since they use hydrogen sulfide as hydrogen donor, instead of water like most other photosynthetic organisms, including cyanobacteria.

All other microbes are called heterotrophs, which get their energy from consuming the fixed carbon in living and dead organisms. Some are aerobic requiring oxygen for metabolism, and others are anaerobic, which do not. Most bacteria may be placed into one of three groups based on their response to gaseous oxygen. Aerobic bacteria thrive in the presence of oxygen and require it for their continued growth and existence. Other bacteria are anaerobic, and cannot tolerate gaseous oxygen, such as those bacteria which live in deep underwater sediments, or those which cause bacterial food poisoning. The third group is the facultative anaerobes, which prefer growing in the presence of oxygen, but can continue to grow without it.

Carbon is recycled aerobically where plants and soil microbes photosynthesize the carbon dioxide and make organic compounds, such as sugars. Other chemo-lithiotropic bacteria can assimilate carbon dioxide in the dark. Certain bacteria are also capable of anaerobic carbon cycling. Chemo-organotrophic microbes break down organic material to release carbon dioxide for plant or microbe photosynthesis. Some saprobic bacteria microbes break down the organic material through fermentation or respiration reactions producing carbon dioxide, methane, and hydrogen, which methane oxidizing bacteria assimilate to produce sugars and amino acids. Thus carbon dioxide is released from and assimilated into soils by various soil microbes and plants.

The carbon cycle is the biogeochemical cycle by which carbon is exchanged among the biosphere, the pedosphere, geosphere, hydrosphere, and atmosphere of the Earth. A diagram of the entire carbon cycle and the carbon dioxide interchange between carbon sinks can be found at http://www.uwsp.edu/geO/faculty/ritter/geog1 . . . . The diagram shows the role soils play in sequestering carbon. Soils sequester 1,580 GigaTons of Carbon and respire 60 GigaTons of Carbon annually. Soil organic matter thus holds almost three to four times the amount of carbon as that contained in the atmosphere.

The article in PhysicalGeography.net, Chapter 9: "Introduction to the Biosphere (r) The Carbon Cycle" outlines how carbon dioxide in various forms is circulated between and contained in various carbon sinks:

| Sink | Amount in Billions of Metric Tons |
| --- | --- |
| Atmosphere | 578 (as of 1700)-766 (as of 1999) |
| Soil Organic Matter | 1500 to 1600 |
| Ocean | 38,000 to 40,000 |
| Marine Sediments and Sedimentary Rocks | 66,000,000 to 100,000,000 |
| Terrestrial Plants | 540 to 610 |
| Fossil Fuel Deposits | 4000 |

This large soil carbon sink is the only practical method of sequestering carbon as oceans and sediments are difficult to access and adapt for this purpose.

In an effort to sequester more atmospheric carbon into soil organic matter, the Soil Science Society of America, the American Society of Agronomy, and other world scientific organizations have relied and advocated for farmers to grow crops using practices that include: no till or reduced tillage; crop rotation; the use of cover crops; fertility management; and water management (as it pertains to the amount used), etc., as being the "primary tools" and overall strategy to accomplish that goal. While these methods can be helpful and on the "right track", their ability to sequester more net atmospheric carbon into soil organic carbon, both separately and as a whole, is extremely limited because the actual process of growing crops and supplying the necessary plant biomass itself mechanically disturbs the soil through tilling and aeration to break up bicarbonate buildup. In the process of mechanically disturbing the soil, as for example, tilling the soil to loosen carbonate clogged pores of the soil to increase water soil penetration, the process turns and exposes what soil organic carbon there is and makes it susceptible to erosion and die off through exposure to sunlight, heat, and wind, causing large portions of the soil carbon pool to diminish or become lost.

Land-use changes associated with agriculture can disrupt the natural balance between the production of carbon-containing biomass and the release of carbon by soil respiration. One estimate suggests that this imbalance alone results in an annual net release of $CO_2$ to the atmosphere from agricultural soils equal to about 20 percent of the current annual release of $CO_2$ from the burning of fossil fuels. Agricultural practices in temperate zones, for example, can result in a decline of soil organic matter that ranges from 20 to 40 percent of the original content after about 50 years of cultivation. Although a portion of this loss can be attributed to soil erosion, the majority is from an increased flux of carbon to the atmosphere as $CO_2$. Consequently, more often than not, a net loss of soil carbon results from mechanical tillage methods alone.

Another approach for opening soil pores is to increase carbon sequestration by applying strong mineral acids to break down the carbonate/bicarbonate soil deposits. These strong mineral acids, such as hydrochloric acid, sulfuric acid, and phosphoric acid have no buffering capability, and if not applied in the right dilution actually shock the soil and release $CO_2$ directly into the atmosphere as the soil carbonates/bicarbonates react to the strong acid rather than dissolving as bicarbonates into the aqueous fraction. Low acid pH applications of around 1 to 2 are also damaging to plant roots and soil bacteria so that further uptake of $CO_2$ is adversely affected creating a soil dead zone. In addition, some of these strong mineral acids, such as hydrochloric acid, increase the chloride concentration in the soil exacerbating harmful saline salt buildup. For this reason, use of the current "state of the art" methods provides only "a partial solution" at best, and cannot be relied upon as the sole means to restore and/or sequester more organic carbon back into the soil.

Current methods to sequester carbon re thus inefficient and/or inherently flawed because they do not include the integration of sulfur (S), in a particular form or manner (sulfur dioxide), to increase the population density of microbes within a soil and water solution; and/or as the means to provide and regulate the free hydronium aqueous cation ($H_3O^+$) within that system (pH) in order to achieve optimal condition in which the sequestering of carbon can be maximized.

The present method described below recognizes the acid buffering relationship required to adjust the soil carbonate/bicarbonate cycle using the controlled hydronium aqueous cation $H_3O^+$ application in conjunction with calcium ion $Ca^{+2}$ soil pH adjustment to create a sustainable soil condition that will enable plants and soil microbes to optimally photosynthesize and produce the necessary plant and animal biomass which will lead to the acceleration and sequestering of more organic carbon into soil than ever before, such as by promoting deeper root penetration. The present acidification method adapting soils to sequester more carbon is simple to implement, and the net carbon sequestered easy to measure.

BRIEF SUMMARY OF THE INVENTION

According to the Environmental Literacy Council-Soil Ecosystems, http://www.enviroliteracy.org/articl.php/700.html, soils are rich ecosystems, composed of both living and non-living matter with a multitude of interactions between them. Soils are part of natural ecological cycles—carbon, nitrogen, oxygen, water and nutrient. The diversity and abundance of life that exists within the soil is greater than in any other ecosystem. A handful of soil can contain billions of different organisms that play a critical role in soil quality to support plant growth.

Each ecological cycle is unique, but often overlaps. While most nutrient cycles move between the atmosphere (air), hydrosphere (water), lithosphere (land) and biosphere (living things), other nutrient cycles are limited to movement between rocks and soils and plants and animals. Water and nitrogen resources, both essential to all living things only change in the forms they take. The water cycle is very dynamic as water can change from vapor to liquid to snow to ice. Soils role in this process is through infiltration, storage, and transpiration.

Nitrogen, which makes up more than three-quarters of the Earth's atmosphere, must be broken down into other forms in order to be used by living organisms. It is within the nitrogen cycle that soil bacteria converts nitrogen into usable elements (called nitrogen fixing) for plants, animals and humans before it is eventually returned to the atmosphere.

Oxygen is unique in that it not only has its own cycle, it is often integrated into elements within other ecological cycles, as water ($H_2O$), carbon dioxide ($CO_2$), iron oxide ($Fe_2O_3$), and many others. Within the biosphere, photosynthesis is the key driver of the oxygen cycle as plants take in carbon dioxide and expel oxygen for animal and human use. Additionally, in water, oxygen is constantly being dissolved and consumed by microorganisms leading to a balance.

Soil plays a critical role in the carbon cycle since the majority of carbon in the atmosphere comes from biological reactions within the soil. The biological/physical carbon cycle occurs over days, weeks, months, and years and involves the absorption, conversion, and release of carbon by living organisms through photosynthesis, respiration, and decomposition. As discussed above, more carbon dioxide is stored in the world's soils than is circulated within the atmosphere. Soils are dynamic, open habitats that provide plants with physical support, water, nutrients, and air for growth. Soils also sustain an enormous population of microorganisms such as bacteria and fungi that recycle chemical elements, notably carbon and nitrogen, as well as sulfur compounds. The carbon and nitrogen cycles are important natural processes that involve the uptake of nutrients from soil, the return of organic matter to the soil by tissue aging and death, the decomposition of organic matter by soil microbes (during which nutrients or toxins may be cycled within the microbial community), and the release of nutrients into soil for uptake once again. These cycles are closely linked to the hydrologic cycle, since water functions as the primary medium for chemical transport.

Carbon (C) enters the ecosystem primarily from the atmosphere—in the form of carbon dioxide ($CO_2$)—and is taken up by plants and converted into biomass. Organic matter in the soil in the form of humus and other biomass contains about three times as much carbon as does land vegetation. Soils of arid and semiarid regions also store carbon in inorganic chemical forms, primarily as calcium carbonate ($CaCO_3$). These pools of carbon are important components of the carbon cycle because they are located near the soil surface where they are subject to erosion and decomposition. Each year, soils release 4-5 percent of their carbon to the atmosphere by the transformation of organic matter into $CO_2$ gas, a process termed soil respiration. This amount of $CO_2$ is more than 10 times larger than that currently produced from the burning of fossil fuels (coal and petroleum), but it is returned to the soil as organic matter by the production of biomass.

The present carbon sequestration method uses sulfur dioxide ($SO_2$)/sulfurous acid ($H_2SO_3$) treatment to amend land applied waters from all sources, including surface water from rivers, lakes, reservoirs, deep wells, agricultural drainage, recycled water from wastewater treatment facilities, blow down water from cooling towers, food processing, production water accumulated as a result of mineral, crude oil, and coal bed natural gas mining operations, etc., so that these waters can then be used as the medium to introduce a significant amount of additional acidity into a soil/water system that is beyond what nature normally provides. Acidity is thus applied as part of the hydrological cycle to the soil in a manner to intersect and join the carbon and sulfur cycles to accelerate soil sequestration of carbon.

Sulfurous acid is represented by the chemical compound $H_2SO_3$. The conjugate bases of this elusive acid are common bisulfite anions, $HSO_3^-$, and sulfite ions $SO_3^=$. In the aqueous form, sulfur dioxide is diprotic, having two hydrogen atoms, which may dissociate from the parent molecule. Consequently, it has two dissociation constants, the first for the rapid dissociation into the bisulfate (hydrogen sulfite) ion:

$$H_2SO_3 \rightleftharpoons HSO_3^- + H^+$$

$K_{a1} = 1.54;\ pK_{a1} = 1.810\ \text{at}\ 25°\ C.$

Delayed release of the second hydronium ion provides a buffering action to aqueous sulfurous acid solutions:

$$HSO_3^- \rightleftharpoons SO_3^{2-} + H^+$$

$K_{a2} = 6.61 \times 10^{-8};\ pK_{a2} = 7.180\ \text{at}\ 25°\ C.$

Figure 1:
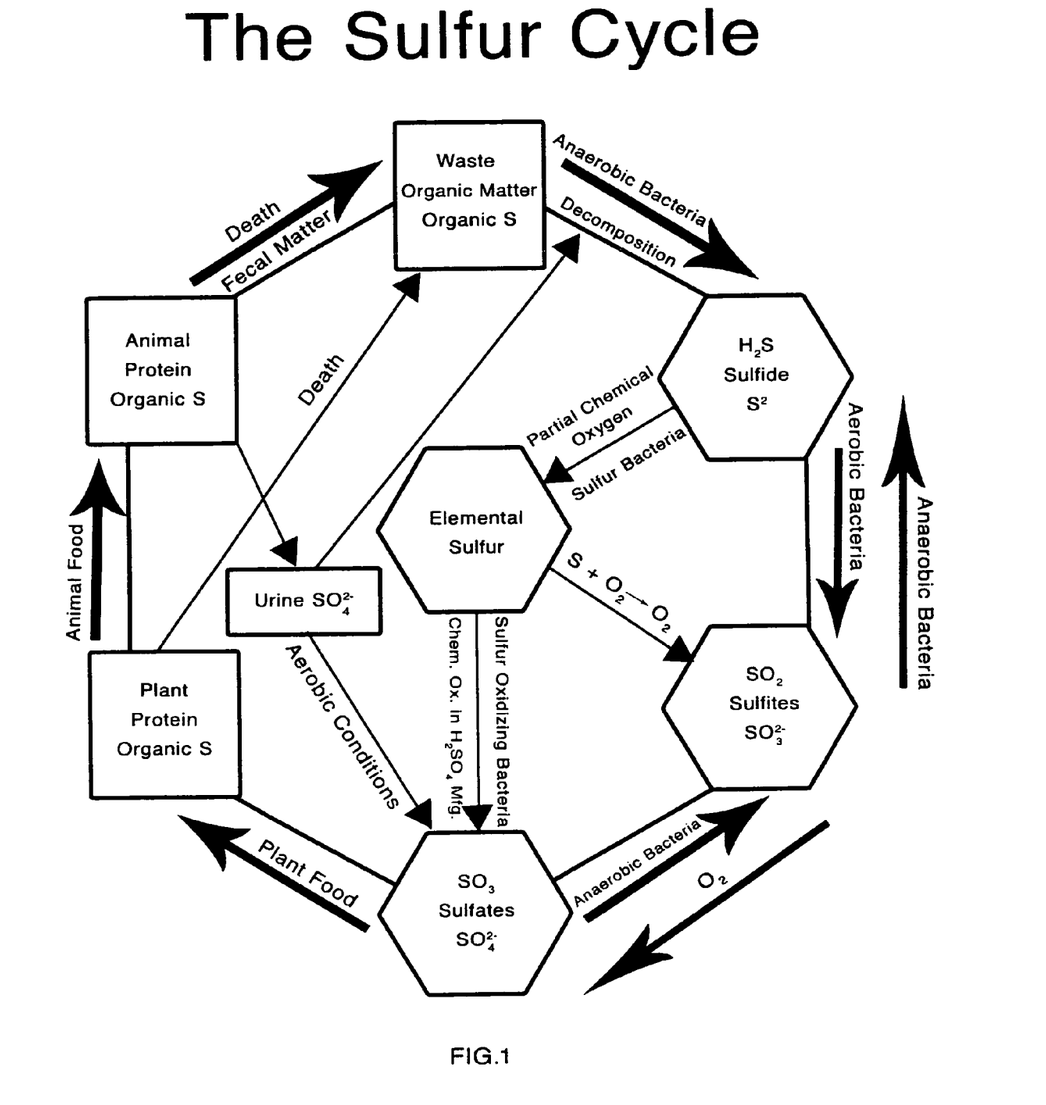
FIG. 1 is a diagram of the sulfur cycle.

The sulfurous acid provides sulfite as part of the sulfur cycle, which acts as a nutrient for various soil microbes as shown in FIG. 1. In organisms that are capable of heterotrophic, mixotrophic, chemolithoautotrophic, and phototrophic growth, elemental sulfur oxidation is one of the most energy-yielding reactions as elemental sulfur is an intermediate in sulfur-oxidizing metabolism. In fact, elemental sulfur is the electron donor in aerobic and facultative aerobic archaea. It is oxidized via sulfite and thiosulfate in a pathway involving sulfite acceptor oxidases and has recently been proven to be coupled to the aerobic respiratory chain, indicating that there is a connection between oxygen reduction and sulfur oxidation.

Soil bacteria make sulfate/sulfite reduction possible at normal temperatures that would otherwise require much higher temperatures. Subsurface hydrogen sulfide, sulfur, sulfides, and other sulfur compounds such as thiosulfate, terrathionate, and sulfites can be oxidized by colorless bacteria of the genera *Thiobacillus*, *Beggiatoa*, *Crenothrix*, *Thiotrix*, and *Thoploca*, which, as autotropic organisms, obtain their energy for carbon assimilation by chemosynthesis. $H_2S$ is first converted to free sulfur, which can be temporarily stored inside or outside the cell before it oxidizes to sulfuric acid. Many types oxidize only the hydrogen sulfide, to elemental sulfur, which is then oxidized by other species.

$$2H_2S + O_2 \to 2H_2O + 2S$$

$$2S + 3O_2 + 2H_2O \to 2H_2SO_4$$

$$2FeS_2 + 2H_2O + 3O_2 \to 2FeSO_4 + 2H_2S$$

$$Na_2SO_3 + H_2O + 2O_2 \to Na_2SO_4 + H_2SO_4$$

This $H_2S$ sulfide oxidation cycle intersects the carbon cycle where sulfur-oxidizing bacteria of the genus Thiobacillus use the following two "generic" reactions to absorb carbon dioxide. The first oxidizes sulfides to sulfur:

$$CO_2 + H_2S \leftrightarrow CH_2O + 2S + H_2O$$

The second oxidizes sulfide to sulfate:

$$2CO_2 + H_2S + 2H_2S \leftrightarrow 2(CH_2O) + H_2SO_4$$

Figure 2:
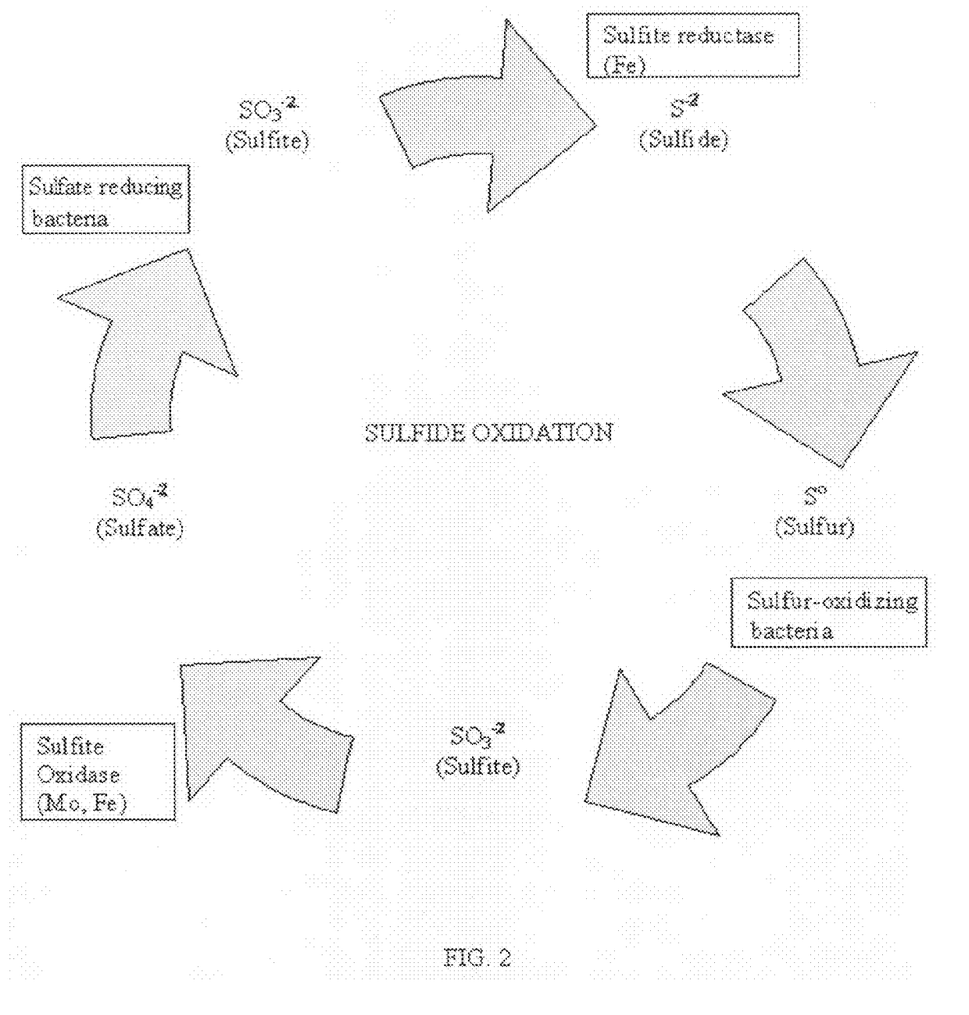
FIG. 2 is a diagram of the sulfide oxidation cycle.

As shown in the FIG. 2 diagram of the sulfide oxidation cycle, the rate-limiting step is controlled by the amount of enzyme sulfite oxidase and its co-factors molybdenum and iron. Sulfite oxidases (SOs) are molybdenum-coordinating proteins belonging to the broad class of enzymes that comprise three separate families, the bacterial-eukaryotic xanthine oxidase family, the eukaryotic sulfite oxidase family, and the bacterial $Me_2SO$ reductase family, all of which are associated with metabolic maintenance of the redox balance in prokaryotic and eukaryotic cells. They catalyze the two-electron oxidation of sulfite to sulfate ($SO_3^{2-} + H_2O \to SO_4^{2-} + 2H^+ + 2\ e^-$) with oxygen and/or heme-coordinated iron ions as the final electron acceptor. Sulfite is a strong nucleophilic and reducing compound, and catalysis oxidation reduces it to the more innocuous form sulfate.

Electron transport is guaranteed by a molybdenum center, called the molybdopterin cofactor (MoCo), consisting of a pterin cofactor with molybdenum coordinated by a cysteine ligand from the enzyme and two oxo groups. Among bacteria, the sulfite oxidase from *Starkeya novella* (formerly *Thiobacillus novellus*) consists of a subunit containing one MoCo assembled with a heme-type cytochrome $c_{552}$ subunit that is separately expressed, which forms an heterodimeric active SO.

The SO from *Arabidopsis thaliana* (At—SO) is homodimeric and homologous to animal sulfite oxidases, but it contains only the MoCo domain without any heme-binding domain or alternatively bound heme, as indicated by its spectral properties and by the lack of activity with cytochrome c, which requires heme as a mediator for electron transfer from the MoCo.

Sulfate-reducing bacteria comprise several groups of bacteria that use sulfate as an oxidizing agent, reducing it to sulfide. Most sulfate-reducing bacteria can also use other oxidized sulfur compounds such as sulfite and thiosulfate, or elemental sulfur. This type of metabolism is called dissimilatory, since sulfur is not incorporated—assimilated—into any organic compounds.

The sulfate-reducing bacteria have been treated as phenotypic group, together with the other sulfur-reducing bacteria, for identification purposes. They are found in several different phylogenetic lines. Three lines are included among the Proteobacteria, all in the delta subgroup: Desulfobacterales, Desulfovibrionales, and Syntrophobacterales. A fourth group including thermophiles is given its own phylum, the Thermodesulfobacteria. The remaining sulfate-reducers are included with other bacteria among the Nitrospirae and the gram-positive Peptococcaceae—for instance *Thermodesulfovibrio* and *Desulfotomaculum*, respectively. The genus of Archaea is also known to be capable of sulfate reduction, *Archaeoglobus*.

Thus, the present method not only provides aqueous acid, but sulfites, which promote carbon assimilation by a number of soil bacteria and microbes as this enhanced sulfur cycle intersects the carbon cycle.

Carbon dioxide forms carbonic acid as part of the soil carbon cycle when absorbed by water, and is then delivered to the soil. Carbonic acid is also diprotic with dissociation constants. The first one is for the dissociation into the bicarbonate (hydrogen carbonate) ion:

$$H_2CO_3 \rightleftharpoons HCO_3^- + H^+$$

$K_{a1} = 2.5 \times 10^{-4};\ pK_{a1} = 3.60\ \text{at}\ 25°\ C.$

The second is for the dissociation of the bicarbonate ion into the carbonate ion:

$$HCO_3^- \rightleftharpoons CO_3^{2-} + H^+$$

$K_{a2} = 5.61 \times 10^{-11};\ pK_{a2} = 10.25\ \text{at}\ 25°\ C.$

At a given temperature, the composition of carbonic acid is also determined by the partial pressure of carbon dioxide in the atmosphere as the $CO_2$ takes three different carbonate forms (($H_2CO_3$, $HCO_3^-$ and $CO_3^{2-}$) as well as of the hydra tion equilibrium between dissolved $CO_2$ and $H_2CO_3$ with constant $$K_h = \frac{[H_2CO_3]}{[CO_2]}.$$

Deeper soils have $CO_2$ under higher pressures and thus have a lower pH

As bicarbonate concentrations buildup in soils, the bicarbonates precipitate forming carbonates/bicarbonate salts, which plug soil pores in a complicated solids/liquid phase interaction. To free up these soil pores, sulfurous acid waters are pH adjusted and applied to the carbonate/bicarbonate soils at a pH, which dissolves these into bicarbonates in the aqueous phase, preventing significant amounts of carbon dioxide to be released directly into the atmosphere. The acidic soil pH is selected to promote plant root and soil microbial growth. These dissolved bicarbonates are thus held in the aqueous phase for transport and assimilation in the soil by plants and soil bacteria. The unplugged pores also allow plant roots to penetrate deeper into the rhizosphere as discussed below.

Preferred delivery of sulfur dioxide is to oxidize elemental sulfur, as needed to create sulfur dioxide gas (SO2), which is then injected and captured into a side stream of the waters to be land applied to create a concentrated solution of sulfurous acid. The sulfurous acid is then blended with irrigation waters within a conveyance system for land application.

pH adjustments with basic calcium salts such as anhydrous or hydrous lime or calcium oxide or calcium carbonate also adjusts soil sodium absorption ratios, such as SAR conditions so that sodium ions are replaced on the root systems by the calcium ions and washed away from the plant roots; thereby preventing sodium salt damage to the roots. The calcium content of the sulfurous acid pH adjusted water is increased to affect a decrease of the Sodium Adsorption Ratio (SAR) of the acidified waters to enhance the agronomic condition of the soil to which it is applied. Plants are detrimentally affected, both physically and chemically, by excess salts in some soils and by high levels of exchangeable sodium in others. Soils with an accumulation of exchangeable sodium are often characterized by poor tilth and low permeability making them unfavorable for plant growth. Plant growth is important for mine reclamation for several reasons: (i) it provides an erosion control measure for hill slope erosion and stream bank erosion, (ii) it allows for revegetation of reclaimed areas, and (iii) it can possibly aid in metals uptake by phytoremediation. Sodium adsorption ratios (SAR), along with pH, characterize salt-affected soils. It is an easily measured property that gives information on the comparative concentrations of Na+, Ca2+, and Mg2+ in soil solutions. The equation used to calculate SAR is given as follows:

$$SAR = \frac{[Na^+]}{\sqrt{\frac{1}{2}([Ca^{2+}]+[Mg^{2+}])}}$$

where [Na+], [Ca2+], and [Mg2+] are the concentrations in mmol/L of sodium, calcium, and magnesium ions in the soil solution. Concentrations of sodium, calcium, and magnesium are determined by first extracting the ions from the soil into solution. The solution is then analyzed to determine concentrations of the selected ions. Na+, Ca2+, and Mg2+ concentrations are commonly determined using atomic absorption spectrometry (AA). The SAR of a soil extract takes into consideration that the adverse effect of sodium is moderated by the presence of calcium and magnesium ions. When the SAR rises above 12 to 15, serious physical soil problems arise and plants have difficulty absorbing water according to some studies.

As soil bacteria are symbiotically associated with a plant's root system, the pH level required for good root growth is also a good indication as to the pH required for promoting growth of the soil bacteria. A pH level of around 6.3-6.8 is the optimum range for most soil bacteria, although fungi, molds, and anaerobic bacteria have a broader tolerance and tend to multiply at lower pH values. Therefore, more acidic soils tend to be susceptible to souring and putrefaction, rather than undergoing the sweet decay processes associated with the decay of organic matter, which immeasurably benefit the soil. These processes also prefer near-neutral conditions.

This method opens up the soil pores and artificially stimulates the creation and/or recreation of the necessary soil conditions that will enable that soil/water system to grow and store a greater net volume of soil organic carbon (SOC) than what it may hold presently, or before receiving this type of material and/or conditioning. This specialized method and technique can be used independently and/or in combination with other materials, amendments, and methods.

These sulfur dioxide-treated waters are applied to agricultural crop and grazing lands; forests and all other lands; including all waters used for aquaculture; where the sequestering of carbon in this form would be considered beneficial to the environment and wildlife. Currently, there is an extensive and on going debate regarding the relationship of green house gases such as carbon dioxide and global climate change and it is likely that this debate may go on forever. Regardless as to which side is right or wrong, the concept of sequestering more carbon from the atmosphere into soil organic carbon is considered to be highly desirable and generally agreed by both sides to improve and preserve the overall fertility of existing soils, resulting in producing crops that are higher in quality and yield, and increasing profitability even before assigning any monetary value or financial reward (the trading of carbon credits) for sequestering the additional soil organic carbon. This method dissolves carbonates that are native to the soil, and/or to re-dissolve carbonates formed by previous applications of irrigation water that are alkaline, so that maximum pore space at the soil/air interface is opened and kept open, and to maximize and increase the penetration of oxygen and other atmospheric gases as deep as possible throughout the soil profile. Doing so results in a net carbon dioxide plant adsorption increase that will also enable aerobic soil bacteria to be exposed to breathe in and absorb more oxygen (O) and exchange and release carbon dioxide ($CO_2$), which in turn enables anaerobic microbes to flourish increasing overall anaerobic and aerobic population density. By introducing this extra amount of acid, optimal soil conditions at upper soil levels enable plants to: readily photosynthesize and transform more atmospheric carbon into their own biomass as organic carbon; develop a larger, more extensive, and deeper rooting structure; which ultimately results in providing more food, organic matter, and pathways, etc., for microbes to decompose and produce the other various organic compounds that will increase its overall fertility and to sequester and achieve a net increase of organic soil carbon within it.

At deeper soil depths more carbon dioxide is encountered than oxygen. Here, anaerobic bacteria convert sulfites and absorb carbon dioxide from the dissolved bicarbonates.

This method of acidifying the water with sulfur dioxide and sulfurous acid treatment manufactured to the desired concentration on or off site by sulfur dioxide ($SO_2$)/sulfurous acid ($H_2SO_3$) generation thus conditions soils to improve carbon sequestration by plants and soil microbes. The sulfurous acid provides the necessary acidity to neutralize, and/or eliminate the total alkalinity (measured as bicarbonates/carbonates) inherent to such waters so that they can act and serve as the medium that introduces and delivers the necessary acidity to dissolve, and/or eliminate both separately or in combination the carbonates/bicarbonates of any soil or water system. This regulates and controls the overall pH of such systems to achieve maximum porosity of the soil/air interface, so that atmospheric gases, such as oxygen and carbon dioxide, water, and soluble nutrients can penetrate and exchange as deeply as possible throughout the soil to which it is applied. This also allows the adjustment of the sodium adsorption ration (SAR) of such systems to a range that is considered optimal and favorable for agronomic and microbial activity to occur at concentration levels selected for raising plants or growing soil microbes to absorb carbon dioxide. Additional sulfur in a form suitable for soil microbial consumption is also provided to increase their populations enabling them to absorb and sequester even greater amounts of carbon dioxide.

The concentration and amount of the sulfurous acid applied will be dependent on site specific requirements at each location and the type of plants/crop being grown, and soil microbes present. As a guide to the amount of sulfurous acid needed, titration curves of sulfurous acid with carbonic acid may be used to locate the optimal pH required.

pH adjustment with anhydrous or hydrous lime, calcium oxide, calcium carbonate or other calcium bases added to the sulfurous acid is used to adjust the pH and calcium ion concentrations to provide soil/water sodium adsorption ratios (SAR) less than 15, electrical conductivity (EC) less than 2 dS $m^{-1}$ (m mho $cm^{-1}$), cation exchange capacity (CEC) less than 57.5 centimoles/kg, and a pH less than 8.

The specific soil ratios and concentration levels are thus selected for raising plants and soil microbes to absorb carbon dioxide and reduce soil bicarbonates/carbonates to increase soil porosity and improve water penetration.

An example of how this conditioning method can be used to sequester more organic carbon into soil uses wastewater recovered by the Earth Renaissance Technology, LLC Biobrimstone™ wastewater treatment methodology described in co-pending application Ser. No. 12/286,083. The acidified recovered treated wastewater with its high calcium content, nitrogen, and plant nutrients has the ability to lower the pH of alkaline soil by delivering additional acidity into the soil to act as a soil amendment to reopen and create additional soil pore space, and to keep them open while nutrients in the wastewater (such as nitrogen) can be used as a fertilizer and removed by the plant themselves during the growth process, and before they can enter and cause environmental damage to our nation's natural waterways as non-point source pollution.

Other examples where this method may be well suited and used is crude oil mining, and the coal bed natural gas industry. This is because these mining processes oftentimes require a tremendous amount of water to be pumped out of underground formations for natural gas to become accessible. In many cases, because their production water byproduct is usually highly alkaline and saline, it can easily damage soil if it is land applied. To dispose of it, much of it is stored and evaporated in earthen pits and its value and potential as an aid to store and sequester soil organic carbon is never fully recognized. By merely acidifying it so that it can carry and deliver the necessary acidity to open more pore space to the soils to which it is applied, crops and/or natural forge grasses can be grown and the total plant biomass created can produce more food and cover for wildlife, as well as the plant biomass and feedstock to support a higher microbial population to sequester more soil organic carbon. Thus, this method of acidification adds value to their production water by converting it from being waste byproduct into something that they can utilize and receive another source of revenue (the potential for carbon credit trading) to offset their operational costs while at the same time becoming even better stewards of the environment.

However, the primary example is to enhance the carbon cycle and its relationship to soil sequestration by plants and their roots biological processes at upper soil levels. Dr. Christine Jones in her article "Soil and Carbon Credits" dated Sunday, Mar. 5, 2006, YLAD Living Soils Seminars: Eurongilly—February 14, Young—15 Feb. 2006 Aggregate or aggravate? Creating soil carbon explains the carbon cycle and its relationships to soil sequestration by plants. She says that carbon compounds are essential to the creation of 'topsoil' from the structureless, lifeless 'mineral soil' produced by the weathering of rocks. Around 50-80% of the organic carbon that was once in the topsoil has been lost to the atmosphere over the last 150 years or so. Degraded soils have the potential to store up to five (5) times more organic carbon in their surface layers than they currently hold.

The present method thus adjusts the soil porosity of the soil rhizosphere, which encompasses the millimeters of soil surrounding a plant root where complex biological and ecological processes occur. The cheapest, most efficient and most beneficial form of organic carbon for soil life is exudation from the actively growing roots of plants, particularly those in the Poaceae family, which includes pasture grasses and cereals according to Dr. Jones. The breakdown of their fibrous roots becomes an important source of carbon in soils. Organic carbon additions are governed by the volume of plant roots per unit of soil and their rate of growth. The more active plant roots there are, the more carbon is added. The present method opens the soil pores and delivers nutrients deeper into the soil so that plant roots rapidly penetrate deeper into the soil. These deeper reaching roots exude (secrete) a vast array of compounds into the rhizosphere and regulate soil microbial communities, which encourage beneficial symbioses, change the chemical and physical properties of the soil, encouraging $CO_2$ absorption by aerobic soil microbes. The ability to secrete a vast array of compounds into the rhizosphere is one of the most remarkable metabolic features of plant roots, with nearly 5% to 21% of all photosynthetically fixed carbon being transferred to the rhizosphere through root exudates according to some studies. The biogeochemical reactions induced by microorganisms at the rhizosphere soil-root interface play an important role in the bioavailability of nutrients and metals to plants. This microenvironment is characterized by distinct physical, chemical, and biological conditions compared with the bulk soil, largely created by the plant roots and its microbial associations. Such associations can include nonsymbiotic and symbiotic organisms such as bacteria and mycorrhizal fungi. These microbial populations are an essential part of the rhizosphere and affect the rhizosphere soil by their various activities such as water and nutrient uptake, exudation, and biological transformations.

The present method not only opens up the soil pores, but transports organic acids, sugars, amino acids, lipids, coumarins, flavonoids, proteins, enzymes, aliphatics, metals, and aromatics within this microzone. The organic acids provide substrates for microbial metabolism and serve as intermediates for biogeochemical reactions in soil.

Nutrients and metals are typically present in the soil solution at low concentrations and tend to form sparingly soluble minerals (except nitrogen, sulfur, and boron), or may be adsorbed to a solid phase through ion exchange, hydrogen bonding, or complexation. The extent to which they are transferred from the soil to the .biota (i.e., microbes or plants) is dependent on the biogeochemical interactions and/or processes among the soil, plant roots, and microorganisms in the rhizosphere. At this interface, the presence of root exudates may influence chemical reaction kinetics within the soil environment and subsequently affect biological activities. As such, the role of the rhizosphere on biogeochemical processes within the soil is essential for developing bioremediation technologies of inorganic and organic contaminants.

In this positive feedback loop, $CO_2$ respired by plant roots and aerobic soil microbes, slowly moves upwards through the topsoil and increases the partial pressure of $CO_2$ beneath the crop/pasture canopy, enhancing photosynthetic potential. The regenerative regimes restore soil carbon and soil life. Carbon sequestration in soil is the most potent mechanism available for reducing greenhouse gases and mitigating climate change. In addition to root exudation, soil carbon levels can also be increased using principles employed in the rapidly expanding arena of ecological agriculture, which includes biodynamic, organic and biological farming used in association with the present irrigation method. There are many and varied practices including the use of cover crops, green manures, mulches, worm juice, fish and seaweed products, animal manures, recycled green waste, biosolids, composts, compost teas, liquid injection, humic substances, microbial stimulants and innumerable combinations thereof.

Organic carbon moves between various 'pools' in the soil, some of which are short lived while others may persist for thousands of years. Glomalin and humic substances are two of the relatively stable forms of soil carbon. Their creation and destruction are strongly influenced by land management.

Glomalin is a glycoprotein produced by arbuscular mycorrhizal fungi living on plant roots. Most current soil chemical extraction techniques greatly underestimate the amount of glomalin, which can persist for several decades and may account for one third of the organic carbon stored in agricultural soils. Dr Sara Wright (USDA-ARS) has shown that glomalin contributes about seven times more carbon to total soil organic carbon than do humic acids. This discovery has attracted a great deal of interest from a carbon storage and carbon trading perspective, in addition to the multiple benefits for soil and catchment health. Glomalin forms on the outer surface of the hyphae of mycorrhizal fungi, which colonize on the roots of certain plants. The number and activity of these affects the amount of glomalin that can be produced. Most members of the grass family are excellent host mycorrhizal fungi, which have up to 100 meters of microscopic fungi per gram of soil under healthy grassland conditions. Enhancing grassland root production with the present method thus enhances glomalin production.

Humus use is the best known of the stable organic fractions in soils and can also be stimulated by the present method. Humus has never been clearly defined or understood. One reason for this is that humus is an integral component of the soil matrix and cannot be successfully isolated for scientific research. Synthetic humus or extracted humus does not have the same properties as humus found naturally within the soil. There are many theories on the formation of humus, most of which suggest a microbial resynthesis and polymerization of carbon compounds derived from organic matter. If soil conditions are conducive to biological activity however, levels of humus can increase to a greater extent than would be possible from the weight of organic materials grown or applied. This suggests that microbial stimulation per se may be the factor of greatest importance, with organic matter simply fueling the process.

In healthy soils, stable humic substances can persist for over one thousand years. Bare earth and practices that destroy soil structure, such as intensive tillage or the application of anhydrous ammonia result in the loss of humus. Humic substances have significance above and beyond the relatively long-term sequestration of atmospheric carbon. They are extremely important in terms of pH buffering, inactivation of pesticides and other pollutants, improved plant nutrition and increased water-holding capacity of soil. Humic substances can also effectively ameliorate the symptoms of dryland salinity by chelating salts and stimulating biological activity. Loss of humus therefore has a highly significant effect on the health and productivity of soil.

By increasing soil carbon absorption by the present method, significant increases in net carbon credits result. The world's soils hold around twice as much carbon as the atmosphere and almost three times as much carbon as the vegetation. Soil represents the largest carbon sink over which we have control. Improvements in soil carbon levels could be made in all rural areas, whereas the regions suited to carbon sequestration in plantation timber are limited.

In the example given by Dr. Jones, soil carbon content is usually expressed as either a concentration (%) or a stock (t/ha). Unless the depth of measurement and soil bulk density parameters are known, it is not possible to accurately convert from one unit of measurement to the other. Some simple estimates, however, can be made. Changes in the stock of soil carbon (t/ha) for each 1% change in measured organic carbon (OC) status for a range of soil bulk densities and measurement depths are shown in Table 1. Numbers in brackets represent tCO2 equivalent.

|  | Soil bulk density ($g/cm^3$) | | | | |
| --- | --- | --- | --- | --- | --- |
| Soil depth | 1.0 | 1.2 | 1.4 | 1.6 | 1.8 |
| 0-10 cm | 10 (37) | 12 (44) | 14 (51) | 16 (59) | 18 (66) |
| 0-20 cm | 20 (74) | 24 (88) | 28 (103) | 32 (117) | 36 (132) |
| 0-30 cm | 30 (110) | 36 (132) | 42 (154) | 48 (176) | 54 (198) |

An explanation of these table terms are as follows.

Soil bulk density (g/cm3) is the dry weight (g) of one cubic centimeter ($cm^3$) of soil. The higher the bulk density the more compact the soil. Generally, soils of low bulk density are well structured and have 'more space than stuff'. The lower the bulk density the more room for air and water and the better the conditions for soil life and nutrient cycling. Bulk density usually increases with soil depth, unless acidified with the present method to open up the soil pores. To simplify the table it was assumed that soil bulk density did not change with depth.

$CO_2$ equivalents are estimated as follows:

Every ton of carbon lost from soil adds 3.67 tons of carbon dioxide ($CO_2$) gas to the atmosphere. Conversely, every 1 t/ha increase in soil organic carbon represents 3.67 tons of $CO_2$ sequestered from the atmosphere and removed from the greenhouse gas equation.

From TABLE 1, a 1% increase in organic carbon in the top 20 cm of soil with a bulk density of 1.2 g/cm3 represents a 24 t/ha increases in soil OC which equates to 88 t/ha of CO2 sequestered. TABLE 1 tracks changes in the stock of soil carbon (tC/ha) for each 1% change in measured organic carbon (OC) status for a range of soil bulk densities and measurement depths. Numbers in brackets represent tCO2 equivalent.

Sequestered carbon is a tradeable commodity whose values vary with market fluctuations. In the example given, if the $CO_2$ equivalent in the above example was worth $15/t, the value of sequestered soil carbon in 'carbon credits' would be $1,056/ha. If the soil carbon concentration was increased by 1% to a depth of 30 cm rather than to 20 cm, this would represent 132 t/ha sequestered $CO_2$ at a value of $1,980/ha.

If organic carbon concentrations were increased by 2% to a depth of 30 cm in the same example, this would represent $3,960/ha, or almost $400,000 in 'carbon credits' per 100 ha of regenerated land. Even if organic carbon levels were only increased by 0.5% in the top 10 cm of soil this would represent 22 t/ha sequestered $CO_2$ valued at $33,000 per 100 ha regenerated land (assuming a soil bulk density of 1.2 g/cm3 and a price of $15/t $CO_2$ equivalent).

Carbon credits for sequestered carbon increases are available to stimulate green house gas reduction. In order to receive further credits, the level of soil carbon would need to be further increased. It is also important that the OC level for which payment was received is maintained by the employment of the present method to increase biological activity deeper into the soil.

The present method also improves the carbon and nitrogen soil exchange. Nitrogen moves between the atmosphere and the topsoil in similar ways to carbon. The main difference is that the 'way in' for atmospheric carbon is via green plants whereas the 'way in' for atmospheric nitrogen is soil microbes. Soils acting as net sinks for carbon are usually also acting as net sinks for nitrogen. The flip side is that soils losing carbon are usually losing nitrogen too. In poorly aerated soils, some of this loss is in the form of nitrous oxide ($N_2O$), a greenhouse gas up to 300 times more potent than carbon dioxide, while other losses include easily leached nitrate ($NO_3-$) which often takes calcium, magnesium and potassium with it, leaving the soil more acidic (lower pH).

The present method thus aids soil regenerative practices increasing the porosity of soils at greater depths with sulfurous acid to increase the depth to which water, carbon dioxide and sulfur nutrients penetrate to allow soil microbes to assimilate them to sequester carbon. These lighter, softer and springier soils are easier to dig or till, are less prone to erosion, water logging or dryland salinity so the organic carbon levels increase sequestering carbon.

DESCRIPTION OF THE ILLUSTRATED EMBODIMENT

FIG. 1 is a diagram of the sulfur cycle produced by Kenneth J. Edwards, Jr., vice president of the Alken-Murray Corporation showing how aerobic and anaerobic bacteria assimilate sulfates, sulfites, sulfur, and sulfides.

FIG. 2 is a diagram of the sulfide oxidation cycle taken from the article entitled, "Sulfur Oxidation, Biogeochemical Cycles, Soil Microbiology, explaining how sulfides are oxidized, http://filebox.vt.edu/users/chagedor/boil_4684/Cycles/Soxidat.html.

Figure 3:
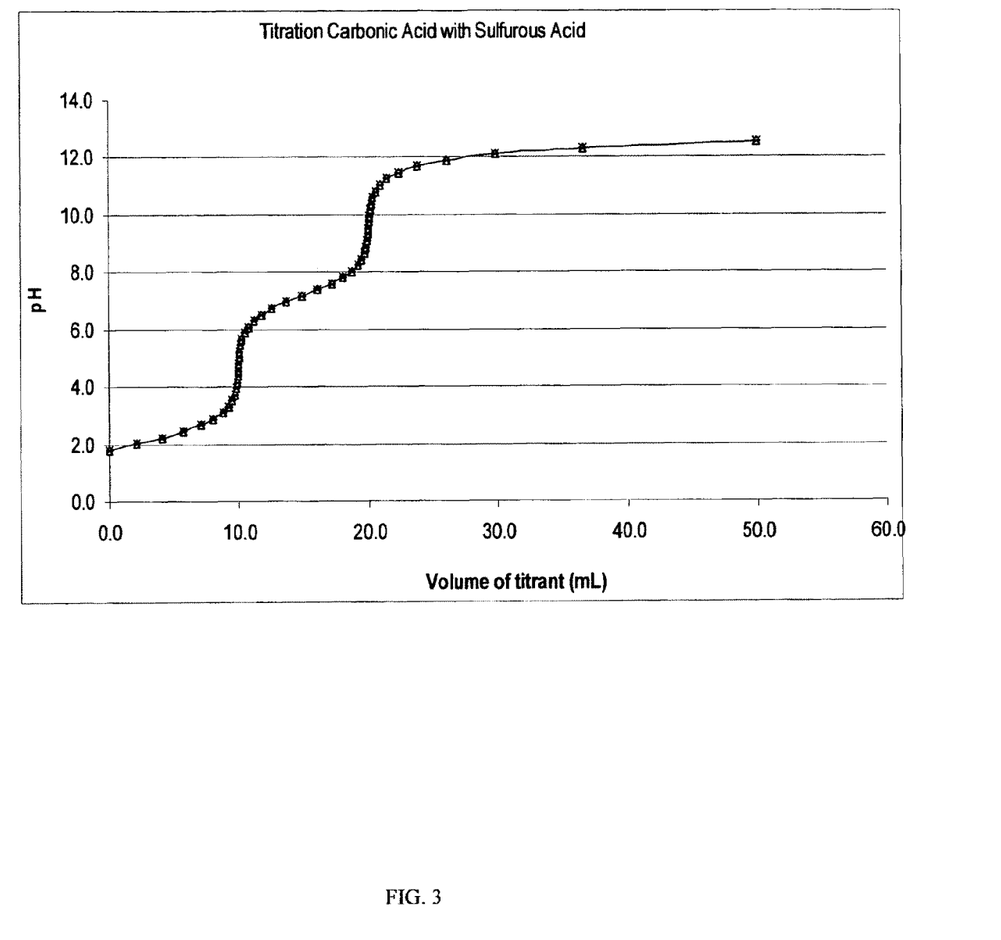
FIG. 3 is an illustration of a pH titration curve of carbonic acid with sulfurous acid.
Figure 4:
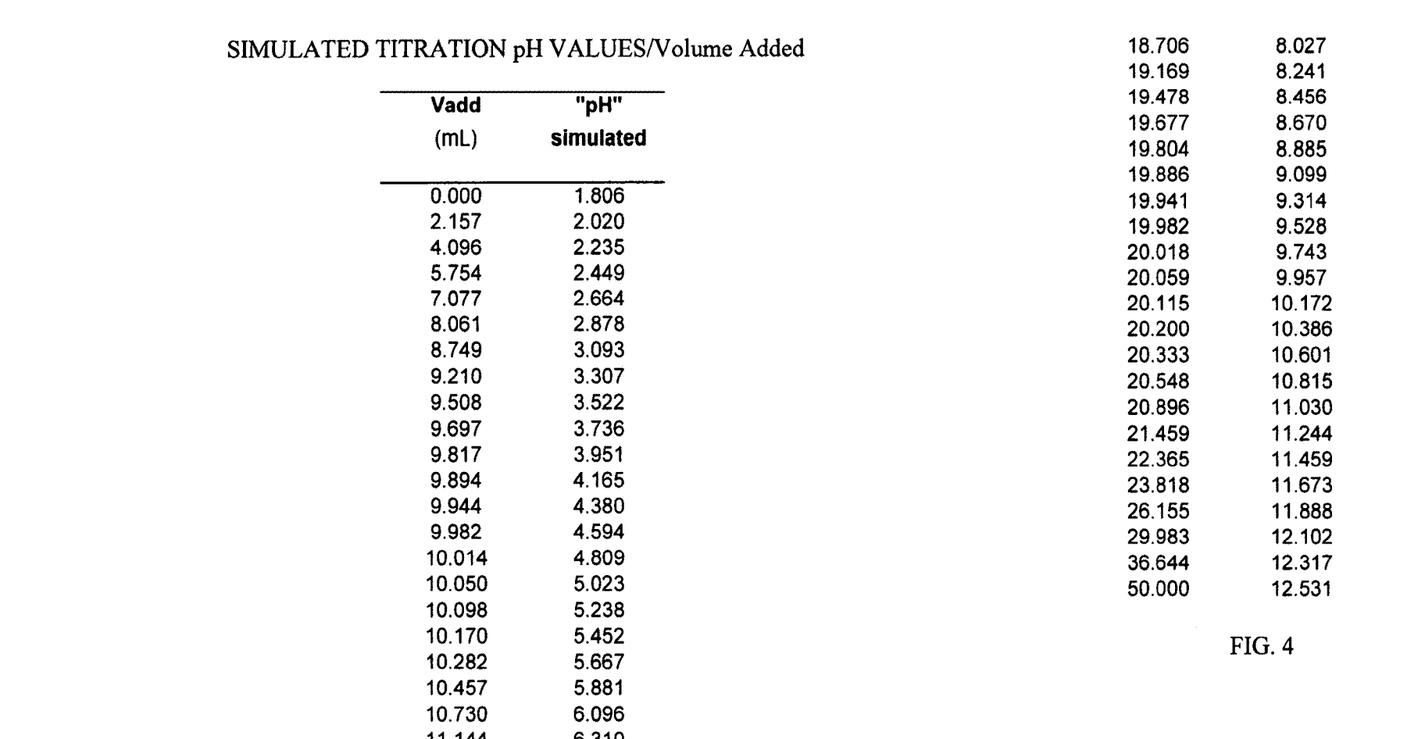
FIG. 4 is the data plot of the pH titration curve of FIG. 3.

FIG. 3 is an illustration of a typical pH titration curve of carbonic acid with sulfurous acid. It was generated by the CurtiPlot® 1992-2008 computer model program developed by Professor Gebhardt Rolf Gutz of Universidane de Sao Paulo. 20 ml. of 0.0 r mol/L of Titrant Carbonic Acid having an initial pH of 1.806 was titrated with 0.1 mol/L of Titrant sulfurous acid and the pH computer simulated as shown in FIG. 4.

These computer generated titration curves provide a good approximation as to the amount of sulfurous acid required to adjust the soil/water pH for a given carbonic acid soil water system. As actual soils are of complex geochemical compositions and have differing liquid/solids/gas phases, actual acid applications must be adjusted based on the desired soil ratios to maintain a healthy rhizosphere to sequester carbon. Also, it is difficult to exactly test for carbonic acid specie concentrations exposed to the atmosphere; particularly when samples are taken from deeper soil depths, because of the increased solution concentrations of $CO_2$ at these higher pressures. However, these titration curves of diprotic weakly buffered acids provide useful information as to the probable sulfur requirements.

This sulfurous acid land applied water is then conditioned and pH adjusted with a calcium base to provide the soil ratios discussed above.

Figure 5:
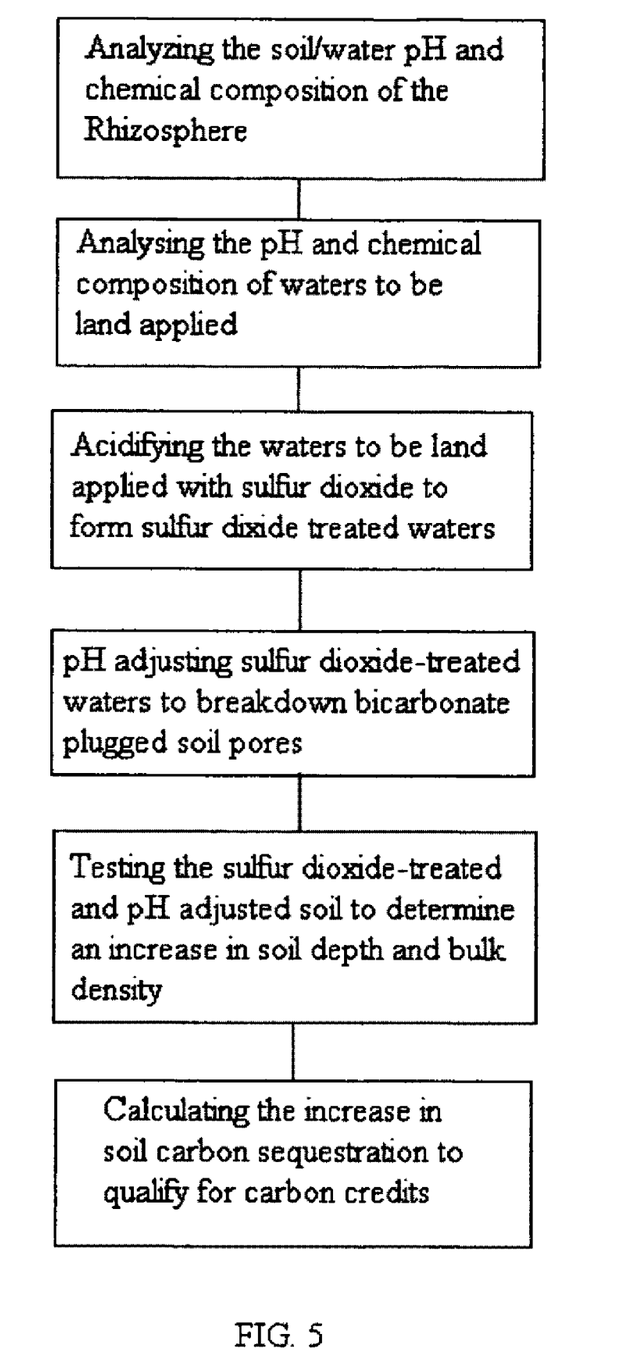
FIG. 5 is an example of one preferred carbon sequestration method.

FIG. 5 is an example of an application of the present method. First, the pH and chemical composition of the soils and rhyizosphere is taken. Then the pH and chemical composition of the waters to be land applied are analyzed. Next the waters to be land applied are acidified with sulfurous acid based on the amounts required as shown by the titration curve of FIG. 3. They are then pH adjusted with lime to provide the right pH to breakdown soil pore bicarbonate buildup so that the plant roots can penetrate deeper into the soil and sequester more carbon dioxide. Lastly the soil is re-tested to determine the increase in soil depth and bulk density to measure the increase in carbon sequestration to qualify for carbon credits.

Figure 6:
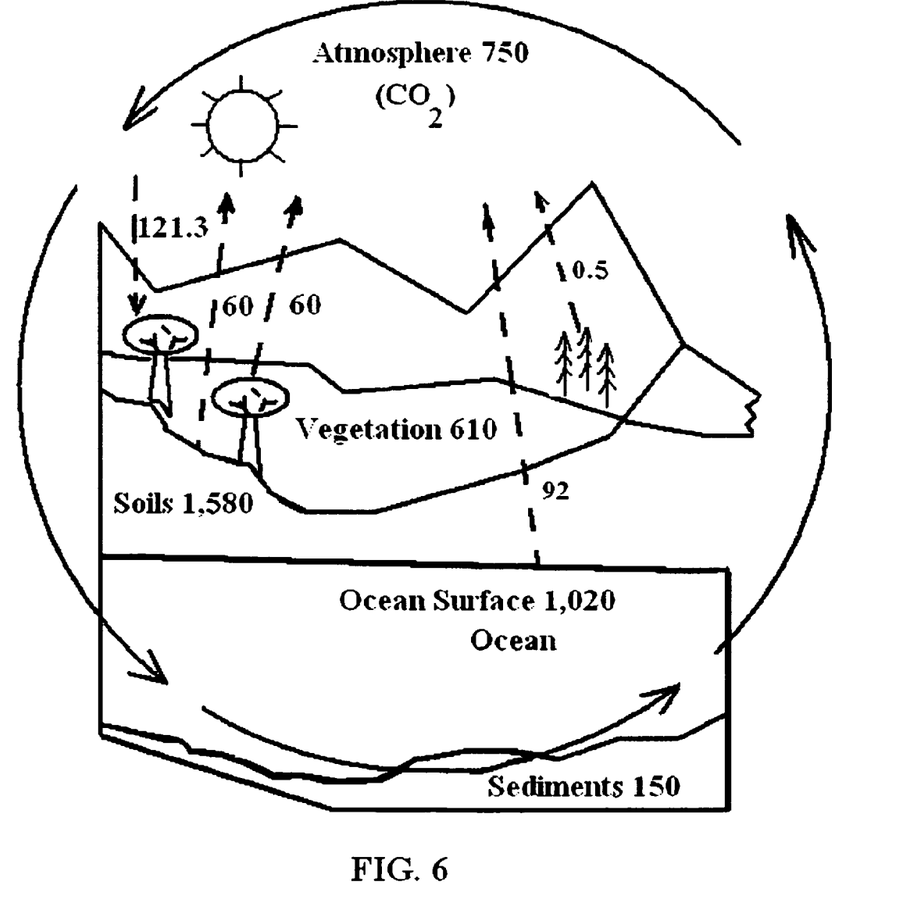
FIG. 6 is a diagram of the carbon cycle as it pertains to soils.

FIG. 6 is a diagram of the carbon cycle as it pertains to soils. The bold black numbers indicate how much carbon is stored in various reservoirs, in billions of tone ("GtC" stands for GigaTons of Carbon circa 2004). The standard numbers indicate how much carbon moves between reservoirs each year. The sediments do not include the ~70 million GtC of carbonate rock and kerogen.

The present invention may be embodied in other specific forms without departing from its structures, methods, or other essential characteristics as broadly described herein and claimed hereinafter. The described applications are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

We claim:
1. A method to enhance sequestration of carbon in soil by raising soil bacteria and microbes comprising:
   a. introducing sulfur dioxide into waters diverted from rivers, lakes, reservoirs, deep wells, agricultural drainage, recycled water from wastewater treatment facilities, blow down water from cooling towers, food processing, production water accumulated as a result of mineral, crude oil, and coal bed natural gas mining operations, or other water sources to form sulfurous acid; and b. applying the sulfurous acid to soil as a means to open up soil pores at deeper depths to:
  i. allow atmospheric gases, water and soluble nutrients to penetrate and exchange throughout the soil, and
  ii. artificially stimulate the creation and/or recreation of the necessary soil conditions to feed and stimulate the growth and raising of water and soil bacteria and microbes, and to reduce total alkalinity and provide sufficient acid to break down soil carbonate/bicarbonates to release carbonic acid, carbonates, bicarbonates, or carbon dioxide in the aqueous phase along with sulfites, bisulfites, sulfur dioxide or sulfates and increase soil porosity at greater depths to improve water, air, and nutrient penetration for growing crops with roots containing soil bacteria and microbes or for growing soil microbes and bacteria at soil sodium adsorption ratios (SAR) less than 15, electrical conductivity (EC) less than 2 dS m$^{-1}$ (m mho cm$^{-1}$), cation exchange capacity (CEC) less than 57.5 centimoles/kg, and pH less than 8 at a range favorable for agronomic and soil microbial and bacterial activity to sequester carbon dioxide into the soil providing a net increase of soil organic carbon (SOC).

2. A method to enhance sequestration of carbon in soil according to claim 1, wherein the specific soil ratios and concentration levels selected for raising plants and soil bacteria and microbes to increase absorbing of carbon dioxide and reduce soil bicarbonates/carbonates.

3. A method to enhance sequestration of carbon in soil according to claim 1, including adding a supplemental source of calcium to the sulfurous acid to reduce soil SAR concentrations.

4. A method to enhance sequestration of carbon in soil according to claim 3, including adding anhydrous or hydrous lime, calcium oxide, calcium carbonate or other calcium bases to the sulfurous acid to raise the pH and calcium ion concentrations to provide soil concentrations of SAR less than 15.

5. A carbon sequestration method according to claim 4, wherein the SAR is selected to create a soil condition in which plants can grow at an optimal rate to continuously create a sufficient amount of plant and root biomass in order to create the necessary feedstock and food source that will be needed to feed and sustain a higher population density of soil bacteria.

6. A carbon sequestration method according to claim 1, wherein the amount of sulfurous acid is applied to maximize sequestered carbon dioxide by keeping and maintaining the aggregate of the open soil pores unplugged in order to optimize the exchange of oxygen (O) and carbon dioxide ($CO_2$) and all of the natural constituents found in normal air, throughout the soil, and to prevent soils from water-logging and the accumulation of salts by allowing the acidified waters to penetrate continuously and leach salts deeper into the soil profile.

7. A carbon sequestration method according to claim 1, wherein the sulfurous acid added to soil has a soil pH of between 2 and 7.0 depending upon the bicarbonate concentration in the water.

8. A carbon sequestration method according to claim 1, wherein the sulfurous acid is generated as needed using a sulfur dioxide/sulfurous acid generator/sulfur burner device that uses the water source to scrub and capture sulfur dioxide and to prevent accidental release of sulfur dioxide into the atmosphere.

9. A carbon sequestration method according to claim 1, including adding multiple plant nutrients and soil amendments to the sulfurous acid to accelerate growth of the plant roots, and to feed and stimulate soil bacteria and microbes.

10. A carbon sequestration method according to claim 1, wherein sulfurous acid concentrations depend upon the Total Alkalinity carbonate/bicarbonate concentrations of the waters.

11. A carbon sequestration method according to claim 1 including pH adjusting sulfurous acid with lime and applying it to the soil to adjust the SAR soil ratio to overcome salinity and promote growing of crops, soil bacteria, and microbes, which sequester carbon dioxide.

12. A method to enhance sequestration of carbon in soil Rhizosphere by raising soil microbes and bacteria comprising:
  a. determining soil pH and chemical composition and plants and soil bacteria and microbes of the Rhizosphere,
  b. determining pH and chemical composition of waters to be land applied,
  c. acidifying the waters to be land applied with sulfur dioxide to form sulfur dioxide treated waters,
  d. pH adjusting the sulfur dioxide-treated waters and land applying the pH adjusted sulfur dioxide treated waters to open up soil pores to:
    i. allow atmospheric gases water and soluble nutrients to penetrate and exchange as deeply as possible throughout the soil, and
    ii. artificially stimulate the creation and/or recreation of the necessary soil conditions to feed and stimulate the growth and raising of water and soil bacteria and microbes, and to reduce total alkalinity and provide sufficient acid to break down soil carbonate/bicarbonates to release carbonic acid, carbonates, bicarbonates, or carbon dioxide in the aqueous phase along with sulfites, bisulfites, sulfur dioxide or sulfates and increase soil porosity at greater depths to improve water, air, and nutrient penetration for growing crops with roots containing soil bacteria and microbes or for growing soil microbes and bacteria at soil sodium adsorption ratios (SAR) less than 15, electrical conductivity (EC) less than 2 dS m$^{-1}$ (m mho cm$^{-1}$), cation exchange capacity (CEC) less than 57.5 centimoles/kg, and pH less than 8 at a range favorable for agronomic and soil microbial and bacterial activity to sequester carbon dioxide into the soil providing a net increase of soil organic carbon (SOC),
  e. testing the sulfur dioxide-treated and pH adjusted soil to determine increases in soil depth and bulk density, and
  f. calculating the increase in carbon sequestration to qualify for carbon credits.

13. A carbon sequestration method according to claim 12, including:
  a. adjusting the of the sulfur dioxide-treated waters with lime and calcium oxide,
  b. adding nutrients to the pH adjusted sulfur dioxide-treated waters, and
  c. continually applying the pH adjusted, nutrient supplemented sulfur dioxide-treated waters until the plant roots and soil bacteria and microbes penetrate to a greater soil depth than before sulfur dioxide treatment.

14. A carbon sequestration method according to claim 12, wherein the waters to be land applied comprise wastewater.

15. A carbon sequestration method according to claim 12, wherein the amount of sulfur dioxide to be added to adjust soil/water pH for a given carbonic acid soil water system is estimated by carbonic acid/sulfurous acid titration curves.

16. A carbon sequestration method according to claim 9, wherein the multiple plant nutrients and soil amendments added to the sulfurous acid to accelerate growth of the plant roots, and to feed and stimulate soil bacteria and microbes comprises wastewater biosolids.

* * * * *